United States Patent [19]

Bratland

[11] 3,829,592

[45] Aug. 13, 1974

[54] MEMBRANE SUBSTANCE CONCENTRATES

[76] Inventor: Arthur O. Bratland, Maudsvei 9, Heie, Norway

[22] Filed: Sept. 2, 1970

[21] Appl. No.: 69,132

[52] U.S. Cl.................. 426/491, 426/185, 426/189, 426/357, 426/471, 426/519
[51] Int. Cl............................................. A23c 9/00
[58] Field of Search............ 99/54, 60, 63; 426/357, 426/491, 519, 185, 189, 471

[56] References Cited
UNITED STATES PATENTS

| | | | |
|---|---|---|---|
| 1,906,713 | 5/1933 | Parsons | 99/60 X |
| 2,526,302 | 10/1950 | Turgasen | 99/122 |
| 2,923,628 | 2/1960 | Otto | 99/63 |
| 3,355,298 | 11/1967 | Loter | 99/54 |
| 3,467,531 | 9/1969 | Bratland | 99/212 |
| 3,503,752 | 3/1970 | Emnevs et al. | 99/54 |
| 3,505,077 | 4/1970 | Bratland | 99/60 X |
| 3,607,301 | 9/1971 | Bratland | 99/60 |

OTHER PUBLICATIONS

Jenness et al.; Principles of Dairy Chemistry, Wiley & Sons, N.Y., 1959 (page 282) SF253J4.
McDougall; The Buttermakers Manual; New Zealand Univ. Press; New Zealand; Vol. 2, 1953; (pages 1,055, 1,059 & 1,060) SF263M25.
Chemical Abstracts; Vol. 65, 1966; 19230f.
Norman; Dried Buttermilk Improves Palatability of Reconstituted Milk; Milk Products Journal; 1955; pp. 38 & 39.
Jenness et al.; Principles of Dairy Chemistry; 1959; Wiley & Sons, New York; SF253J4c.2; pp. 38, 39, 64, 269–271, 273, 280, 282.
Webb et al.; Fundamentals of Dairy Chemistry; Avi; Connecticut; 1965; p. 443 SF253W34c.2.

Primary Examiner—S. Leon Bashore
Assistant Examiner—William F. Smith
Attorney, Agent, or Firm—Kenyon & Kenyon Reilly Carr & Chapin

[57] ABSTRACT

The invention relates to a method of preparing membrane substance concentrates which are especially useful as additives to milk products. One convenient procedure involves emulsifying a product of milk containing membrane substances with fat, separating the emulsion into aqueous serum and fat rich fractions, separating the fat rich fraction obtained into further aqueous serum and fat rich fractions and combining the aqueous serum fractions. If a more concentrated membrane substance concentrate is required, the resulting serum fractions can be emulsified with fat and the whole procedure repeated.

22 Claims, No Drawings

MEMBRANE SUBSTANCE CONCENTRATES

This invention relates to membrane substance concentrates and, in particular, to a method of preparing such concentrates.

It is known that the fat particles in milk are enclosed by membrane-type envelopes that maintain these fat particles in dispersed condition. These membrane substances are protein bodies with a highly complicated chemical structure that is not completely researched and probably incorporates a protein-phospholipoid complex and a triglyceride fraction with a high melting point. These membrane substances envelop the fat particles in milk in the form of a membrane of approximately five micron thickness which has decisive importance for many technological processes. For instance, the skimming and churning of milk, as well as the characteristics of the cream produced during the skimming process, depend to a high degree on these membrane substances. Moreover, the whipping capability of cream, the time required to produce whipped cream, and the serum separation from whipped cream are functions of these membrane substances. In addition, it has been found that milk fat in itself is practically tasteless so that the typical taste of milk products is largely affected by these membrane substances. Furthermore, it has proved necessary, for a variety of purposes, to homogenize milk products in order to enhance their stability (storage life), in addition to improving their taste. In the event of excessive homogenization, i.e. where the surface of the fat particles contained in the milk has become so great, as a result of excessively fine distribution, that the available membrane substances are no longer adequate to envelop this surface, fat is discharged from the homogenized product. The result is an unsaleable product which is especially disadvantageous where it is desired that the milk products be especially highly homogenized for particular applications. None of these deficiencies occur when membrane substances are added to the milk product. The product, moreover, becomes greatly improved with respect to its taste and consumption characteristics.

It is, therefore, an object of the invention to provide membrane substance concentrates for any type of food.

According to the present invention a method of preparing a membrane substance concentrate comprises the steps of a. emulsifying a membrane substance-containing milk product with a fat to form an emulsion of predetermined fat content, b. separating the emulsion into first aqueous serum and fat rich fractions of predetermined fat content, c. separating the first fat rich fraction into second aqueous serum and fat rich fractions of predetermined fat content by clarifixation, and d. combining the first and second aqueous serum fractions to form the membrane substance concentrate.

Alternatively, step (d) can be modified to include
separating the second fat rich fraction into third aqueous serum and fat rich fractions of predetermined fat content, and
combining the first, second and third aqueous serum fractions to form the membrane substance concentrate.

The aqueous serum fraction discharged during clarifixation, i.e., the aqueous phase obtained during the separation of the first fat rich fraction, contains ten times the amount of membrane substances, and the aqueous or water-soluble phase adhering to the second fat rich fraction, that is the precipitated, almost pure fat, approximately 100 times the amount of membrane substances contained in the low fat content fraction separated during the first separation or skimming process. The membrane substance content of the aqueous phases can be increased significantly by repeating the procedure several times. Thus, after repeating the procedure three times the low fat content aqueous serum fraction separated during the first separation or skimming contains about 20 times the amount of membrane substances contained in the low fat content aqueous serum fraction separated in the first skimming process, while the aqueous fraction separated during clarifixation contains about 200 times and the fraction obtained by separating from the second fat rich fraction about 2000 times that amount.

Buttermilk, skim milk, whole milk and whey, as well as mixtures, powders or concentrates thereof, are typical representatives of the membrane substance-containing milk products of the present invention. The fats emulsified into these products include milk fat, vegetable and other animal fats or oils, including marine fats or oils as well as mixtures thereof.

The fats are usually emulsified with the aforesaid milk products at a temperature of 40° to 100°C, preferably forming an emulsion containing 0.8 to 7 percent by weight fat.

During the first separation or skimming process, a first aqueous serum fraction with a fat content between 0.03 and 0.9 percent by weight and a fat rich fraction with a fat content between 2 and 80 percent by weight are preferably produced. The separation of the first fat rich fraction by clarifixation produces a second aqueous serum fraction with a preferred fat content of 0.03 to 7 percent by weight and a second fat rich fraction with a preferred 80 to 100 percent by weight content of free fat. The separation of the third aqueous serum fraction from the second fat rich fraction results in a third fat rich fraction having a preferred free fat content of 99.9 to 100 percent by weight, the serum fraction preferably containing 0.03 to 2 percent by weight fat. The separation or precipitation of the third aqueous serum fraction is conveniently accomplished by melting add/or centrifugation.

The method of this invention can be considered to be an extraction of membrane substances from milk products by means of fats. The number of successive repetitions of the method steps depends on the purpose from which the membrane substance concentrates are produced. The procedure has the advantage that membrane substance concentrates can be separated at three points of the method cycle, the concentrates differing significantly in their membrane substance content. Therefore, it is extremely flexible in its application.

Of course, the individual aqueous serum fractions constituting the concentrates can also be intermixed and employed in the form of a mixture. In order to achieve a rapid concentration of the desired membrane substances, it is best to use only the serums produced during clarifixation and complete purification of the fat for the first repetition of the method cycle. However, in that case the yield will decrease very rapidly. In order to produce greater amounts of concentrate it is best to use a raw milk product material containing membrane substance for each new batch, in addition to the two serum fractions named above. The most rapid concentration is achieved by reusing only the aqueous serum fraction discharged during the final fat purification process.

In the selection of raw materials it is best to use milk products that already have an increased content of membrane substances as a result of previous separation processes. This applies especially to buttermilk or whey, where buttermilk contains approximately five times the amount of membrane substances contained in normal milk.

However, it is also possible to start out from skimmed milk. By the same token, mixtures of such substances with or without natural water content can be used. For instance, powdered buttermilk can be emulsified with skimmed milk and/or water and a fat.

The fats used for emulsification can be selected without restriction in accordance with the requirements imposed by the method parameters, if it is not a primary intention to reuse the fats for food purposes. Thus, the effects of the melting points of the fats, the viscosity of the produced emulsions, etc. can be assembled with the most favorable aspects with respect to process technology in view. Of course, where the fats are selected with a view to their direct use for food purposes, the appropriate requirements can be taken into consideration also, especially with respect to melting point, digestibility, and compatibility with the organism.

The invention will now be illustrated by the following Example:

EXAMPLE

Buttermilk of 0.3 percent fat content was emulsified with rendered butter (lard on dehydrated butter basis) at a temperature of about 80°C, producing an emulsion of 4.3 percent fat content. This emulsion was fed into a commercially available separator and separated into a first aqueous serum fraction containing 0.03 percent fat and a first fat rich fraction containing 55 percent fat. Subsequently, the first fat rich fraction was split in a clarifixator (a centrifuge where the bond between fat particles and their surrounding membrane substances can be broken through an application of counterpressure during centrifuging), yielding a second fat rich fraction containing 90 percent free fat substance, i.e., freed of membrane substance containing fat substances, and a second aqueous serum fraction containing 0.03 percent fat. This serum fraction had ten times the membrane substance content compared to the first aqueous serum fraction obtained during the initial separation or skimming process. Subsequently, the precipitated fat or second fat rich fraction was processed to a content of 99.9 percent free fat substances through melting and centrifugation. The aqueous serum fraction discharged during this fat purification process (fat content 0.5 percent by weight) had a membrane substance content that was about 100 times greater than that of the aqueous serum fraction obtained during the skimming process. The aqueous serum fractions obtained as a result of clarification and final fat purification were combined and again emulsified with rendered butter into a 4.3 percent emulsion as described above. After three repetitions of the process steps mentioned above, i.e., separation, clarification, and removal of fat from the adhering or water-soluble phase, the aqueous serum fraction separated during fat purification contained about 2,000 times the amount of membrane substances compared to the aqueous serum fraction separated during the first separation or skimming step.

The concentrates produced by a method of the present invention can be added to practically all milk products. As mentioned initially, the incorporation of membrane substances will improve the taste and consumption characteristics of milk to a significant degree. Moreover, by adding membrane substance concentrates to milk products, it is possible to emulsify non-milk fats into milk products. This makes it possible to process milk products to the most advantageous state with respect to nutrition and dietetics where digestibility and compatibility are concerned, considerind especially the content of aromatic fatty acids in milk products.

In addition, the membrane substance concentrates covered by this invention can be used to produce emulsions from any fatty substances for use as food products. This concerns primarily the production of margarines and food shortenings. Also, the membrane substance concentrates covered by this invention are extremely well suited for use as additives to desiccated substances such as baking mixes, powdered milk, baby foods, and pudding mixes.

In recombination processes, as well as in the applications named above where they are added to desiccated substances, it is best to use the membrane substance concentrates in powdered form. For this purpose the obtained liquid concentrates are subjected to roller, spraying or freezing desiccation. Spraying desiccation, which can be implemented at temperatures above 100°C, is used primarily for concentrates with a high water content, while freezing desiccation is employed especially for substances with a low water content. Also, the water content can be reduced by evaporation prior to the desiccation procedure. In this case, freezing desiccation is best performed at a temperature between $-20°$ and $-30°C$, using a vacuum. The vacuum can range between $10^{-1}$ and $10^{-2}$ Torr. If necessary, especially for tower desiccation (spraying desiccation), the membrane substance concentrate is transformed into an easily soluble form.

This invention is not limited to the applications outlined above. For instance, the emulsion produced by emulsifying fat substances into a liquid containing membrane substances can be fed, for instance, directly into a clarifixator instead of first subjecting it to a skimming procedure (separating procedure). This is a question of the most advantageous operating conditions. It is obvious that the procedure which is used must always represent an optimum of different types of process conditions.

What I claim is:

1. A method of preparing a milk membrane substance concentrate comprising the steps of
   a. emulsifying a fat and a milk product selected from a group consisting of buttermilk, skimmed milk and whey to form an emulsion of predetermined fat content of from 0.8 to 7 percent by weight fat, said milk product having a fat content and a fat enveloping membrane substance content;
   b. separating said emulsion into a first aqueous serum and a first fat rich fraction, said serum having a fat content less than said predetermined content of said emulsion and a membrane substance content and said first fat rich fraction being of greater fat content than said serum and;

c. subsequently clarifixating said fat rich fraction to separate said fat rich fraction into a second aqueous serum of a membrane substance content greater than said first serum and a second fat rich fraction of greater fat content than said second aqueous serum;

with said second serum constituting a membrane substance concentrate.

2. A method according to claim 1 which further comprises the steps of separating the second fat rich fraction into third aqueous serum and fat rich fractions of predetermined fat content, and combining the second and third aqueous serum fractions to form the membrane substance concentrate.

3. A method according to claim 1, which comprises emulsifying at least one of said aqueous serum fractions with a fat as in step (a), separating another aqueous serum fraction from the resulting emulsion by at least one of steps (b) and (c) and repeating said steps in sequence with said another aqueous serum fraction and subsequent other aqueous serum fractions.

4. A method according to claim 3, which comprises emulsifying a membrane substance-containing milk product selected from the group consisting of buttermilk, skim milk and whey with said one aqueous serum fraction and said fat.

5. A method according to claim 2, which comprises emulsifying at least one of the aqueous serum fractions with a fat as in step (a), separating another aqueous serum fraction from the resulting emulsion by at least one of steps (b), and (c) and repeating said steps in sequence said another aqueous serum fraction and subsequent other aqueous serum fractions.

6. A method according to claim 5, which comprises emulsifying a membrane substance-containing milk product selected from the group consisting of buttermilk, skim milk and whey with said one aqueous serum fraction and said fat.

7. A method according to claim 1, in which the second aqueous serum fraction is dried to a powder.

8. A method according to claim 2, in which at least one of the second and third aqueous serum fractions is dried to a powder.

9. A method according to claim 3, in which the resulting aqueous serum fraction is dried to a powder.

10. A method according to claim 5, in which the resulting aqueous serum fraction is dried to a powder.

11. A method according to claim 1, in which the first aqueous serum and fat rich fractions have fat contents of from 0.03 to 0.9 weight percent and from 10 to 80 weight percent respectively.

12. A method according to claim 1, in which the second aqueous serum and fat rich fractions have fat contents of from 0.03 to 7 weight percent and from 80 to 100 percent respectively.

13. A method according to claim 2, in which the third aqueous serum and fat rich fractions have fat contents of from 0.03 to 2 weight percent and from 97 to 100 weight percent respectively.

14. A method of claim 1, in which the milk product is in concentrated form.

15. A method according to claim 1, in which the fat is at least one of a vegetable fat, a vegetable oil, an animcal fat and an animal oil.

16. A method according to claim 15, in which the animal fat is milk fat.

17. A method of preparing a milk membrane substance concentrate comprising the steps of emulsifying a fat and a milk product selected from a group consisting of buttermilk, skim milk and whey to form a first emulsion of predetermined fat content of from 0.8 to 7 percent by weight fat, said milk product having a fat content and a fat enveloping membrane substance content;

separating said first emulsion by clarifixation into (1) a first aqueous serum having a fat content less than said predetermined content of said emulsion and a membrane substance content less than said milk product and (2) a first fat rich fraction of greater fat content than said serum;

emulsifying said first aqueous serum with a fat to produce a second emulsion; and separating said second emulsion by clarifixation into a second aqueous serum having a fat content less than the fat content of said second emulsion and a second fat rich fraction of greater fat content than said second serum, said second serum forming the membrane substance concentrate.

18. A method according to claim 17 which further comprises emulsifying a membrane substance-containing milk product selected from the group consisting of buttermilk, skim milk and whey with said first aqueous serum fraction and said fat to produce said second emulsion.

19. A method according to claim 17, in which the resulting aqueous serum fraction is dried to a powder.

20. A method according to claim 17, in which the milk product is in concentrated form.

21. A method according to claim 17, in which the fat is at least one of a vegetable fat, a vegetable oil, an animal fat and an animal oil.

22. A method according to claim 21, in which the animal fat is milk fat.

* * * * *